(12) United States Patent
Mahaffy et al.

(10) Patent No.: US 11,629,669 B1
(45) Date of Patent: Apr. 18, 2023

(54) LIQUID MONOPROPELLANT CONTROLLED SOLID ROCKET MOTOR WITH AFT END INJECTION DEFLECTOR

(71) Applicant: EXQUADRUM, INC., Victorville, CA (US)

(72) Inventors: Kevin E. Mahaffy, Oak Hills, CA (US); Marlow Moser, Victorville, CA (US)

(73) Assignee: EXQUADRUM, INC., Victorville, CA (US)

( * ) Notice: Subject to any disclaimer, the term of this patent is extended or adjusted under 35 U.S.C. 154(b) by 40 days.

(21) Appl. No.: 16/831,025

(22) Filed: Mar. 26, 2020

Related U.S. Application Data

(60) Provisional application No. 62/855,498, filed on May 31, 2019.

(51) Int. Cl.

| F02K 9/52 | (2006.01) |
|---|---|
| F02K 9/97 | (2006.01) |
| F02K 9/26 | (2006.01) |
| F02K 9/72 | (2006.01) |
| F02K 9/82 | (2006.01) |
| F02K 9/42 | (2006.01) |
| F02K 9/80 | (2006.01) |

(52) U.S. Cl.
CPC .............. *F02K 9/52* (2013.01); *F02K 9/26* (2013.01); *F02K 9/42* (2013.01); *F02K 9/72* (2013.01); *F02K 9/80* (2013.01); *F02K 9/82* (2013.01); *F02K 9/97* (2013.01)

(58) Field of Classification Search
CPC ..... F02K 9/08; F02K 9/26; F02K 9/64; F02K 9/76; F02K 9/82; F02K 9/97; F02K 9/972; F02K 9/52; F02K 9/605; F02K 9/80; B64G 1/402
See application file for complete search history.

(56) References Cited

U.S. PATENT DOCUMENTS

| 2,674,848 | A | * | 4/1954 | Goddard | .................. F02K 9/52 60/39.461 |
|---|---|---|---|---|---|
| 3,065,596 | A | * | 11/1962 | Frederick | ................. F02K 9/94 60/207 |
| 3,107,187 | A | * | 10/1963 | Rumbel | ................. C06B 25/24 149/19.8 |
| 3,121,312 | A | * | 2/1964 | Philips | ...................... B64C 9/38 244/3.22 |
| 3,228,188 | A | * | 1/1966 | Sargent | ..................... F02K 9/82 60/231 |

(Continued)

FOREIGN PATENT DOCUMENTS

| GB | 1028465 A | * | 5/1966 | ............... F02K 9/82 |
|---|---|---|---|---|
| GB | 1220223 A | * | 1/1971 | ............... F02K 9/82 |

*Primary Examiner* — Todd E Manahan
*Assistant Examiner* — Kyle Robert Thomas
(74) *Attorney, Agent, or Firm* — Hamre, Schumann, Mueller & Larson, P.C.

(57) ABSTRACT

A solid rocket motor is described that includes a solid propellant section, a nozzle, and a source of monopropellant, such as liquid monopropellant. The monopropellant is used to control various operational parameters of the solid rocket motor, such as thrust vector control, roll control, extinguishment of the motor, and cooling of the nozzle and/or nozzle throat. The nozzle and the nozzle throat can be an integrated, single piece assembly that facilitates re-use of the nozzle.

12 Claims, 11 Drawing Sheets

(56) References Cited

U.S. PATENT DOCUMENTS

| | | | | |
|---|---|---|---|---|
| 3,229,461 A | * | 1/1966 | Jones | F02K 9/82 |
| | | | | 239/DIG. 3 |
| 3,584,461 A | * | 6/1971 | Debize | F02K 9/72 |
| | | | | 60/251 |
| 3,945,539 A | * | 3/1976 | Sossong | F02K 9/605 |
| | | | | 222/386.5 |
| 4,387,564 A | | 6/1983 | Carey | |
| 2004/0128980 A1 | * | 7/2004 | Calabro | F02K 9/64 |
| | | | | 60/257 |
| 2012/0227875 A1 | * | 9/2012 | Kim | C06B 45/105 |
| | | | | 149/47 |
| 2017/0138309 A1 | * | 5/2017 | Gagne | F02K 9/425 |

* cited by examiner

LIQUID MONOPROPELLANT CONTROLLED SOLID ROCKET MOTOR WITH AFT END INJECTION DEFLECTOR

This invention has been made with Government support under Contract Number HR001118C0138, awarded by the Defense Advanced Research Projects Agency (DARPA). The Government has certain rights in the invention.

FIELD

This technical disclosure relates to a solid rocket motor where a monopropellant is used to enhance the specific impulse of the solid rocket motor and to control various operational parameters of the solid rocket motor.

SUMMARY

A solid rocket motor (alternatively known as a solid rocket engine) is described that includes a solid propellant section, a nozzle, and a source of monopropellant, such as liquid monopropellant. The monopropellant is used to enhance the specific impulse of the solid rocket motor, and to control various operational parameters of the solid rocket motor. In addition, some monopropellants are an order of magnitude less expensive than solid propellant. Accordingly, in some applications, it is beneficial to maximize the amount of monopropellant used and minimize the amount of solid propellant used. In addition, the techniques described herein helps to maximize mass fraction, which is a key component of the rocket equation. Further, the use of monopropellant is beneficial because the case containing the solid propellant has to be configured to handle high pressure, which increases the weight of the case, and handle high temperature, thereby requiring insulation inside the case which increases weight and cost. In contrast, the tank containing the monopropellant can be lightweight, for example a balloon tank, and can be kept structurally rigid by pressurizations and needs no internal insulation. The walls of the tank can be made very thin since the monopropellant tank only sees low pressure, for example about 30 psi.

For example, the monopropellant can be used to control the burn rate of the solid propellant in the solid propellant section. In one embodiment, the monopropellant can be used to extinguish the burning of the solid propellant in the solid propellant section. For example, a sudden termination of the monopropellant flow into the combustion chamber can cause a rapid pressure decrease in the combustion chamber leading to extinguishment of the burning of the solid propellant. This type of extinguishment can be referred to as dP/dt (a rapid change in pressure over a relatively short period of time) extinguishment or pressure reduction extinguishment. In another example, the burning surface of the solid propellant can be deluged with an extinguishing material, such as water, water and monopropellant, or an excessive amount of the monopropellant, which can result in extinguishment of the burning of the solid propellant. This type of extinguishment can be referred to as deluge extinguishment. The amount of monopropellant that is injected into the combustion chamber can also be controlled, thereby throttling the solid rocket motor and controlling the thrust.

In still another embodiment, the monopropellant can be used to achieve a pulsed operation of the solid rocket motor where the solid rocket motor is pulsed on and off. For example, the dP/dt extinguishment can be used to extinguish the solid rocket motor which can then dwell for a period of time in the off condition. The monopropellant can then be reintroduced into the combustion chamber to reignite the solid propellant. Reignition can occur because the surface of the solid propellant stays hot even after the solid propellant is extinguished. Then, when the monopropellant begins to flow into the chamber again, the monopropellant gasifies in the chamber thus increasing chamber pressure, which increases the ignitability of the solid propellant. Then the monopropellant receives the heat from the surface of the solid propellant and the increased pressure of the chamber causes the monopropellant to ignite/decompose, leading to solid propellant ignition. However, if necessary, a supplemental igniter can be used to help achieve re-ignition.

In another embodiment, the monopropellant can be used to control flight dynamics of the solid rocket motor and thereby the vehicle that the solid rocket motor is mounted on. For example, in one embodiment the monopropellant can be used to control a thrust vector of the solid rocket motor. In another embodiment, the monopropellant can be used to control roll of the solid rocket motor. In still another embodiment, the monopropellant can be used to control both the thrust vector and roll of the solid rocket motor.

In another embodiment, the monopropellant can be circulated through a regenerative cooling passageway of the nozzle to cool the nozzle and/or through a regenerative cooling passageway of a nozzle throat to cool the nozzle throat. The warmed/hot monopropellant can then be injected into the combustion chamber of the solid propellant section.

In one non-limiting embodiment, a method of controlling operation of a solid rocket motor is provided. The solid rocket motor has a solid propellant section with a solid propellant and a combustion chamber, a nozzle through which combustion gas from the combustion chamber exits, and a source of monopropellant. The method comprises igniting the solid propellant in the combustion chamber and exhausting combustion products through the nozzle to generate thrust. In addition, the method includes at least one of the following:
  i) controlling a thrust vector of the solid rocket motor using monopropellant from the source of monopropellant that is directed into the nozzle;
  ii) controlling roll of the solid rocket motor using monopropellant from the source of monopropellant that is directed into the nozzle;
  iii) directing monopropellant from the source of monopropellant into a nozzle regenerative cooling passageway formed in the nozzle to cool the nozzle, and thereafter injecting the monopropellant from the nozzle regenerative cooling passageway into the combustion chamber;
  iv) directing monopropellant from the source of monopropellant into a throat regenerative cooling passageway formed around a nozzle throat to cool the nozzle throat, and thereafter injecting the monopropellant from the throat regenerative cooling passageway into the combustion chamber;
  v) throttling the solid rocket motor by controlling an amount of the monopropellant that is injected into the combustion chamber;
  vi) extinguishing burning of the solid propellant by dP/dt extinguishment using the monopropellant or by deluge extinguishment.

In another non-limiting embodiment, a solid rocket motor includes a solid propellant section having a solid propellant and a combustion chamber, a nozzle having a central longitudinal axis, and a source of monopropellant fluidly connected to the nozzle. In addition, the nozzle includes at least one of the following:

a) a plurality of thrust vector control openings fluidly connected to the source of monopropellant;
b) a plurality of roll control openings fluidly connected to the source of monopropellant;
c) a nozzle regenerative cooling passageway having an inlet that is fluidly connected to the source of monopropellant and an outlet that is fluidly connected to the combustion chamber;
d) a throat regenerative cooling passageway surrounding a nozzle throat having an inlet that is fluidly connected to the source of monopropellant and an outlet that is fluidly connected to the combustion chamber.

In another non-limiting embodiment, a solid rocket motor includes a solid propellant section having a solid propellant with a high metal content above 22% (which is the traditional upper limit for a solid rocket motor), and a combustion chamber, a nozzle having a central longitudinal axis, and a source of liquid monopropellant fluidly connected to the combustion chamber. Once the solid propellant is ignited, the monopropellant can be injected into the combustion chamber to control the thrust of the solid rocket motor.

DRAWINGS

FIG. 1 is a schematic depiction of a liquid monopropellant controlled solid rocket motor described herein incorporated into a vehicle.

FIG. 2 schematically depicts the solid propellant section and the nozzle of the solid rocket motor of FIG. 1.

Figure 6:
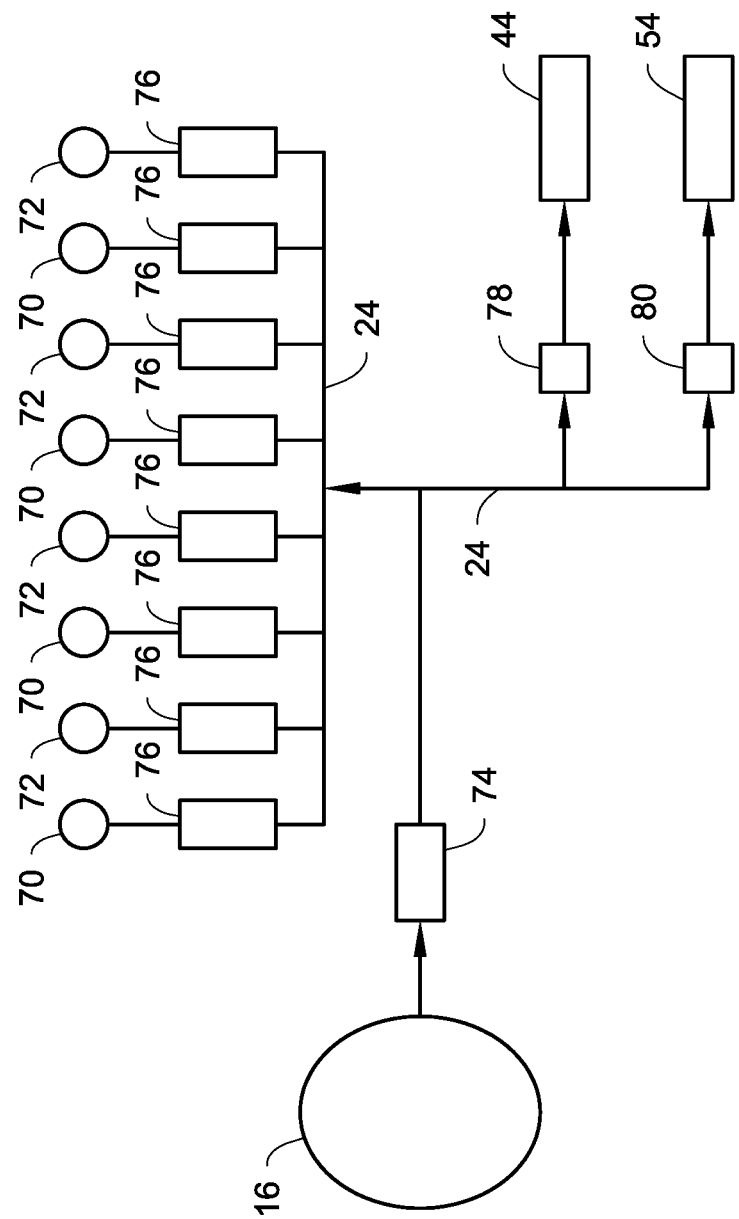

FIG. 6 schematically depicts the fluid circuit between the source of monopropellant and the thrust vector control openings, the roll control openings, and the regenerative cooling passageways of the nozzle.

Figure 3:
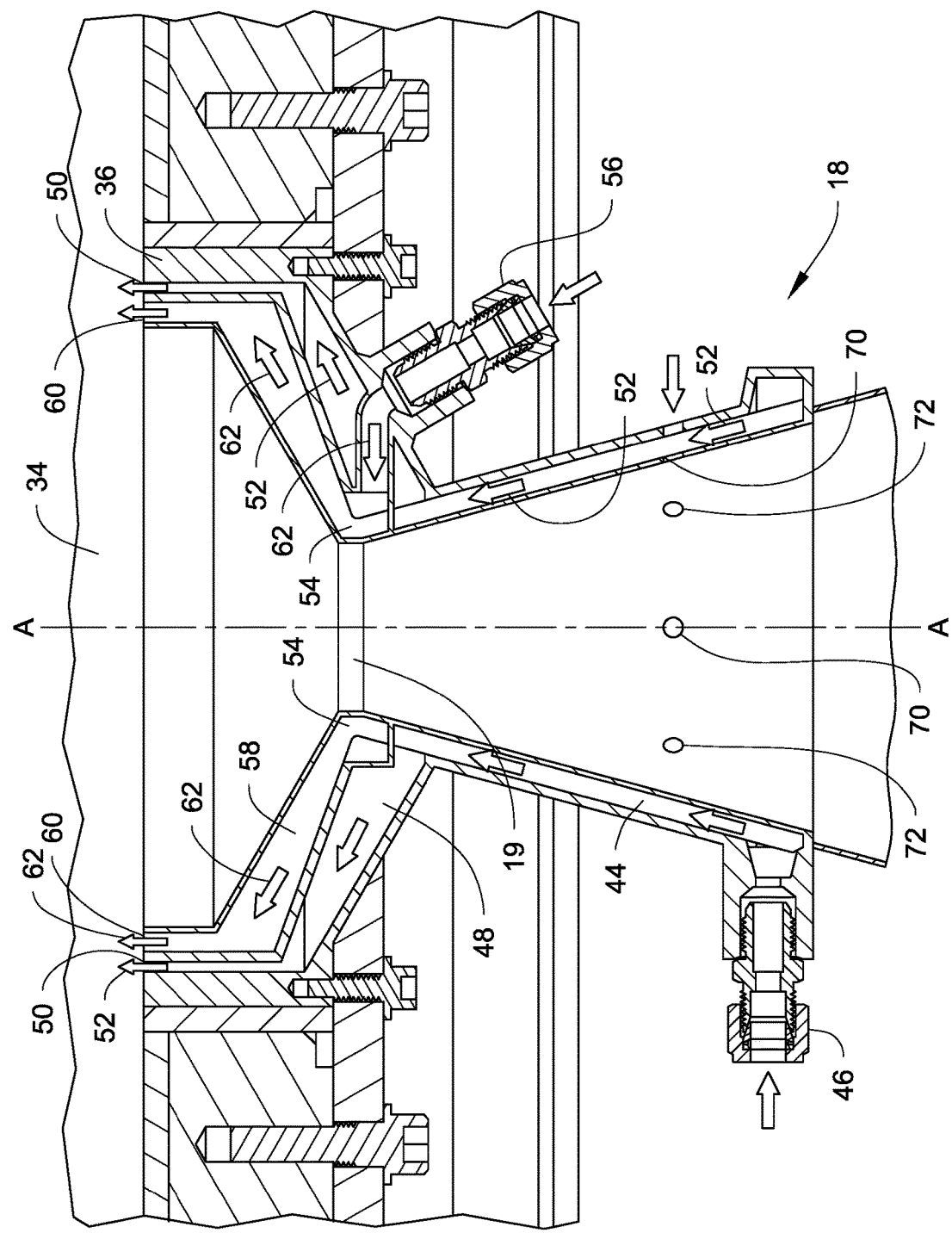
FIG. 3 is a longitudinal cross-sectional view of the nozzle.
Figure 7:
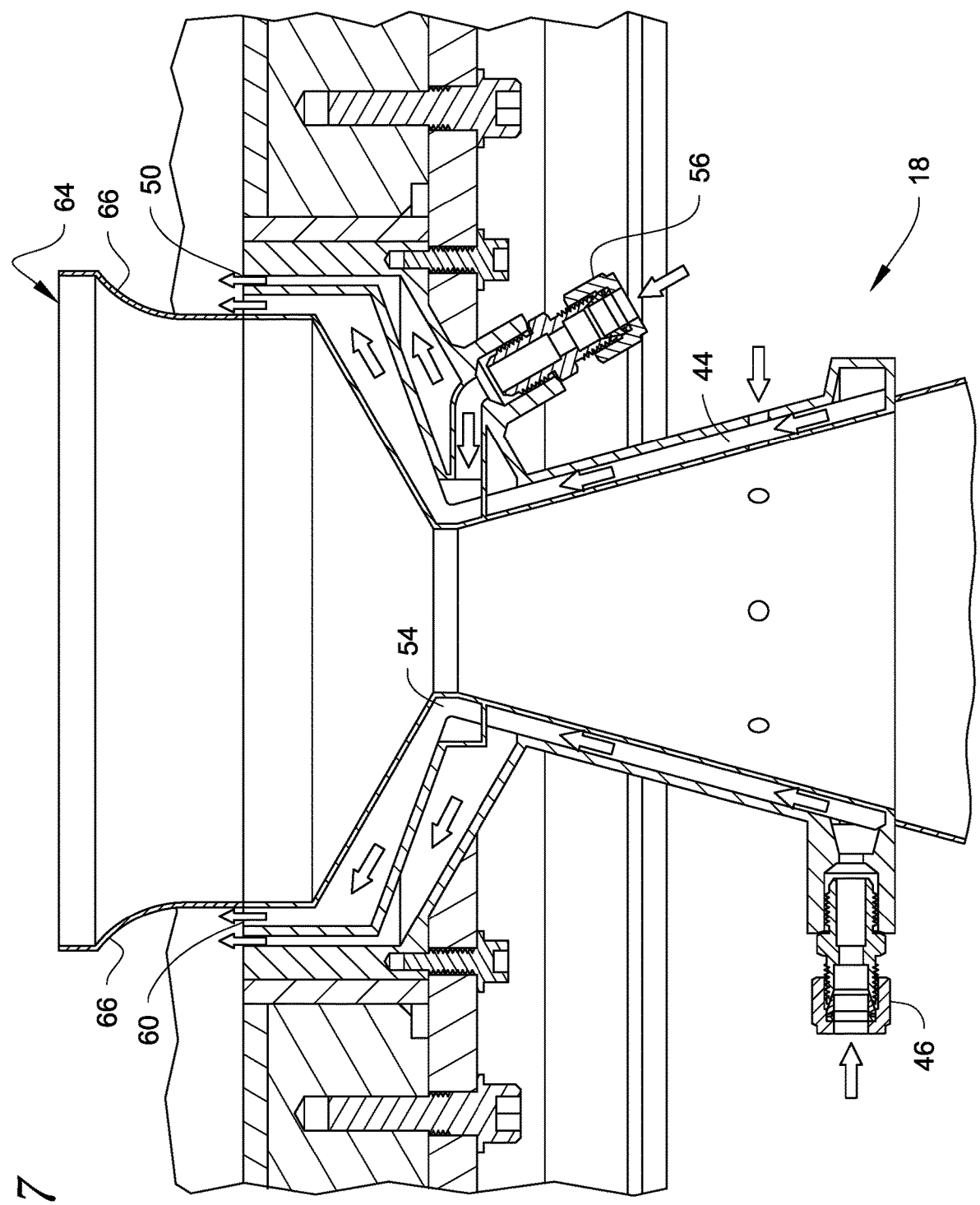

FIG. 7 is a view similar to FIG. 3 but showing the use of a deflector in the combustion chamber to deflect the injected monopropellant in order to produce a spray pattern.

Figure 8:
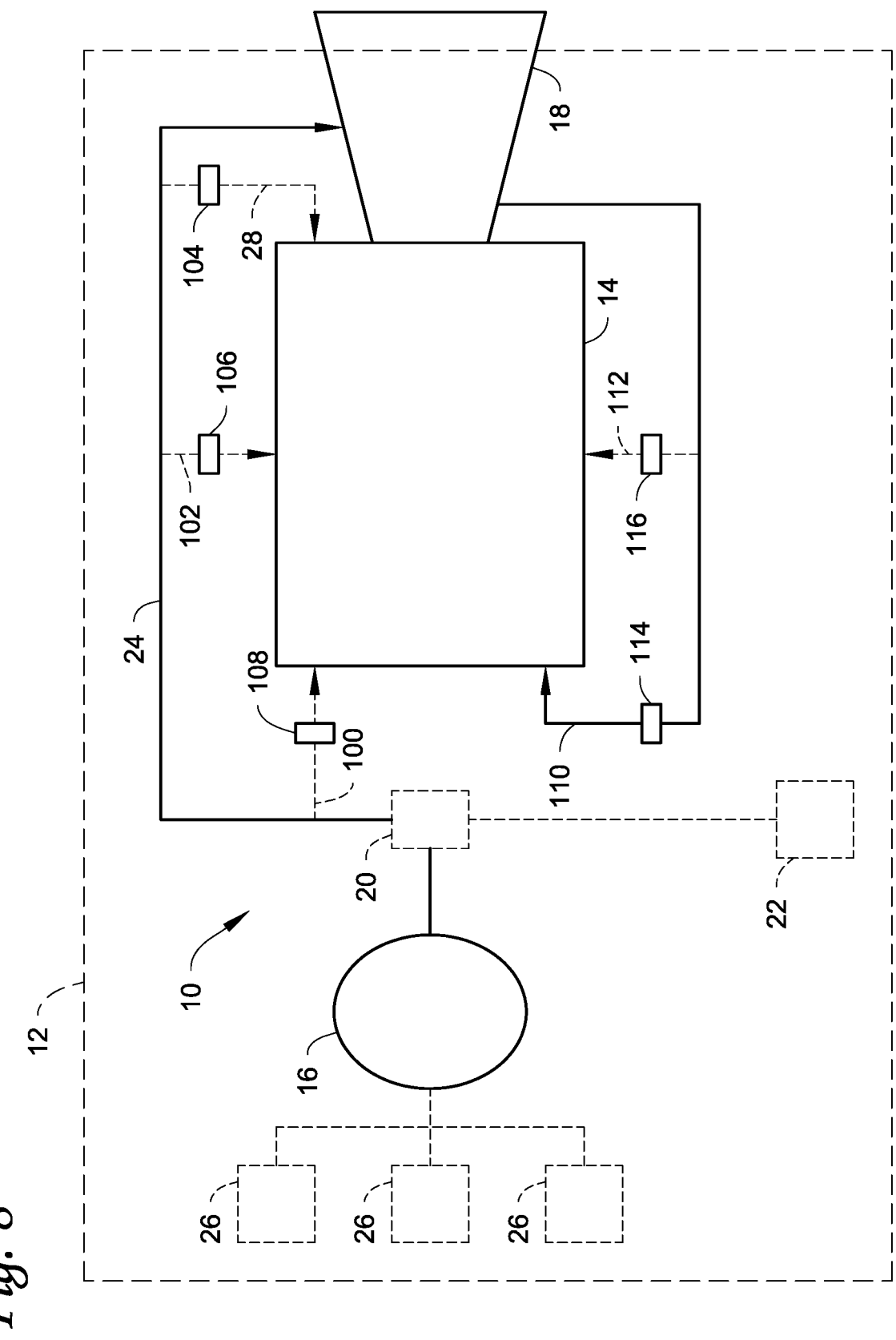

FIG. 8 illustrates another example of a solid rocket motor described herein with head-end injection or central/side injection of the monopropellant.

Figure 9:
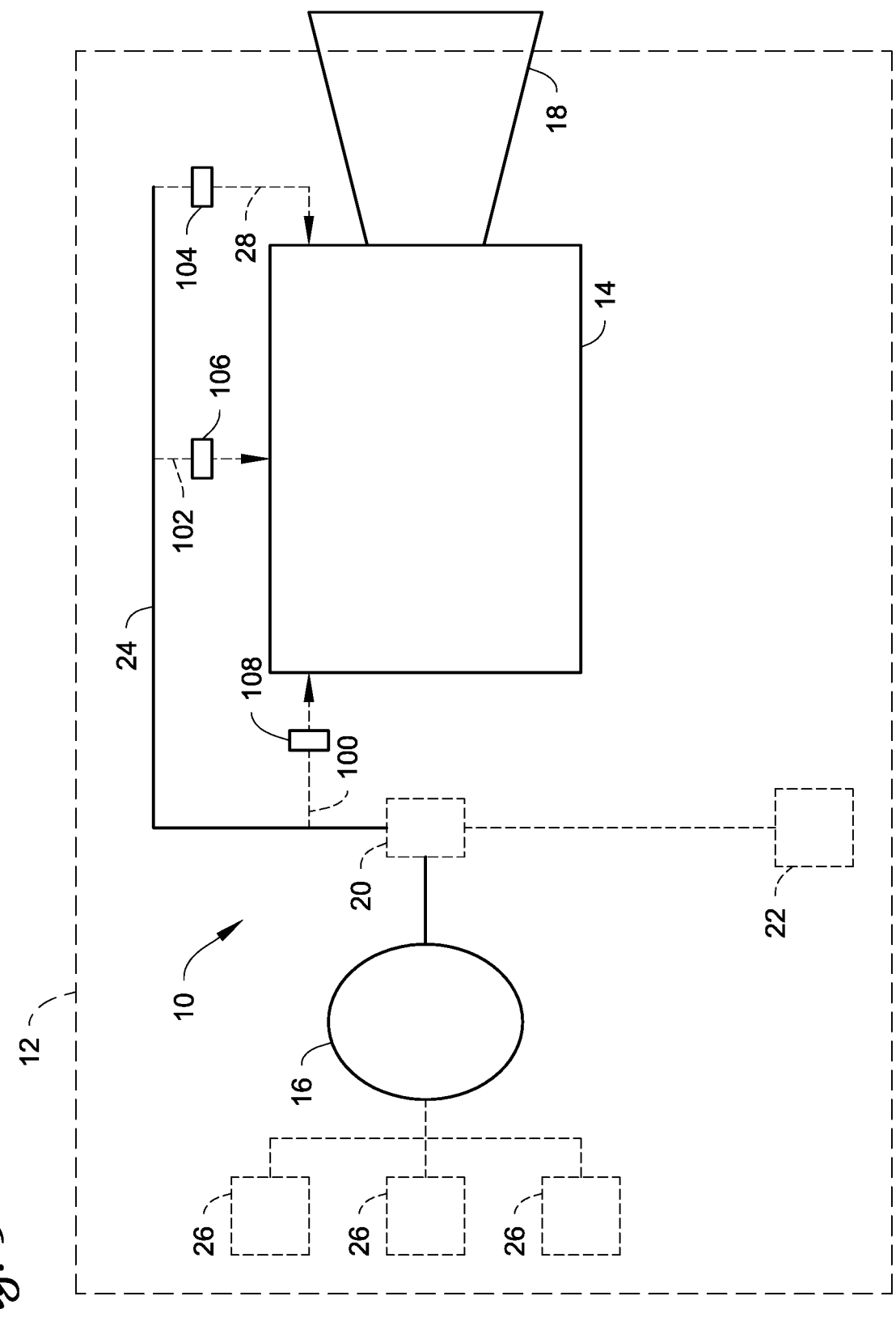

FIG. 9 illustrates another example of a solid rocket motor described herein with a nozzle that is not cooled by the monopropellant.

Figure 10:
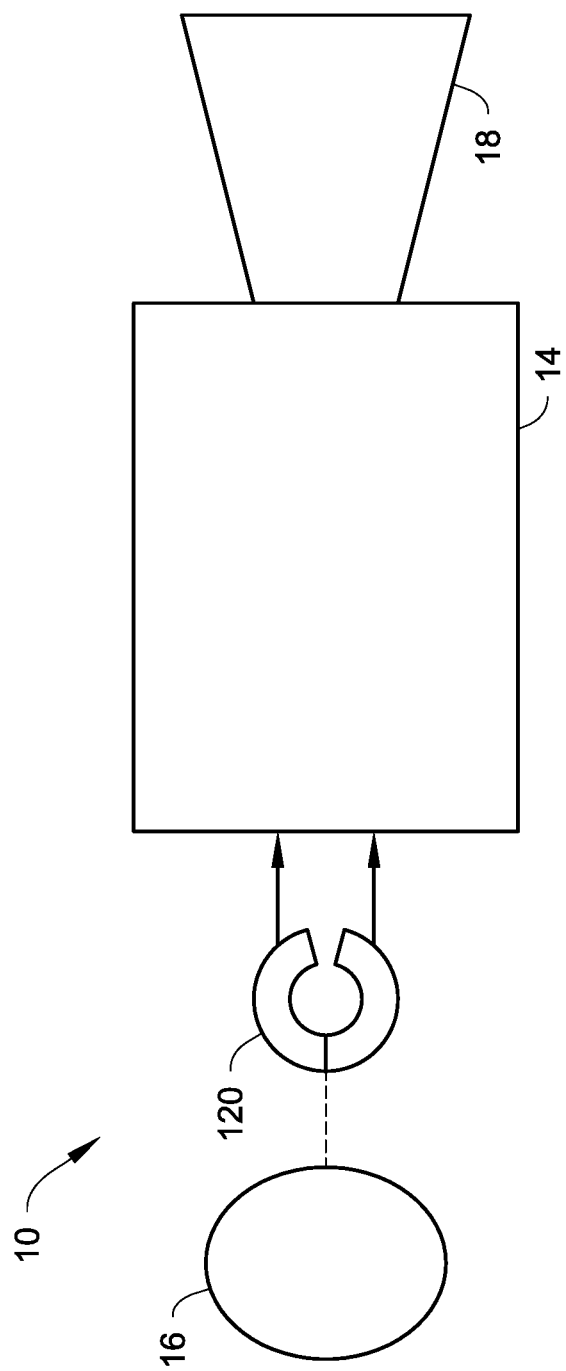

FIG. 10 illustrates another example of a solid rocket motor described herein with water and/or water and monopropellant deluge extinguishment.

Figure 11:
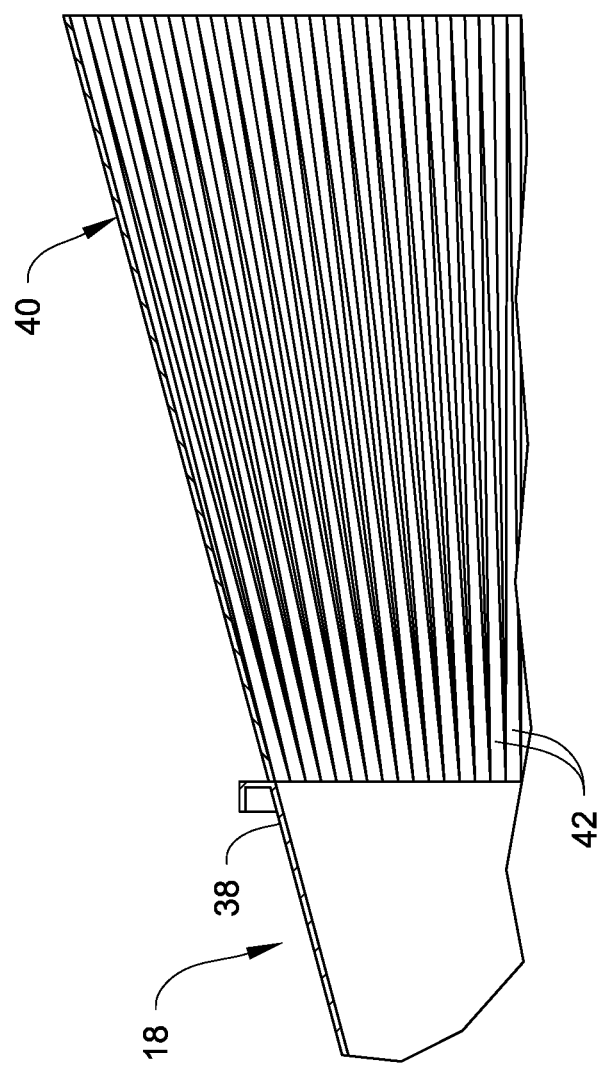

FIG. 11 is a partial sectional view of the nozzle showing a gas-deployed nozzle extension at the outlet of the nozzle.

DETAILED DESCRIPTION

Figure 1:
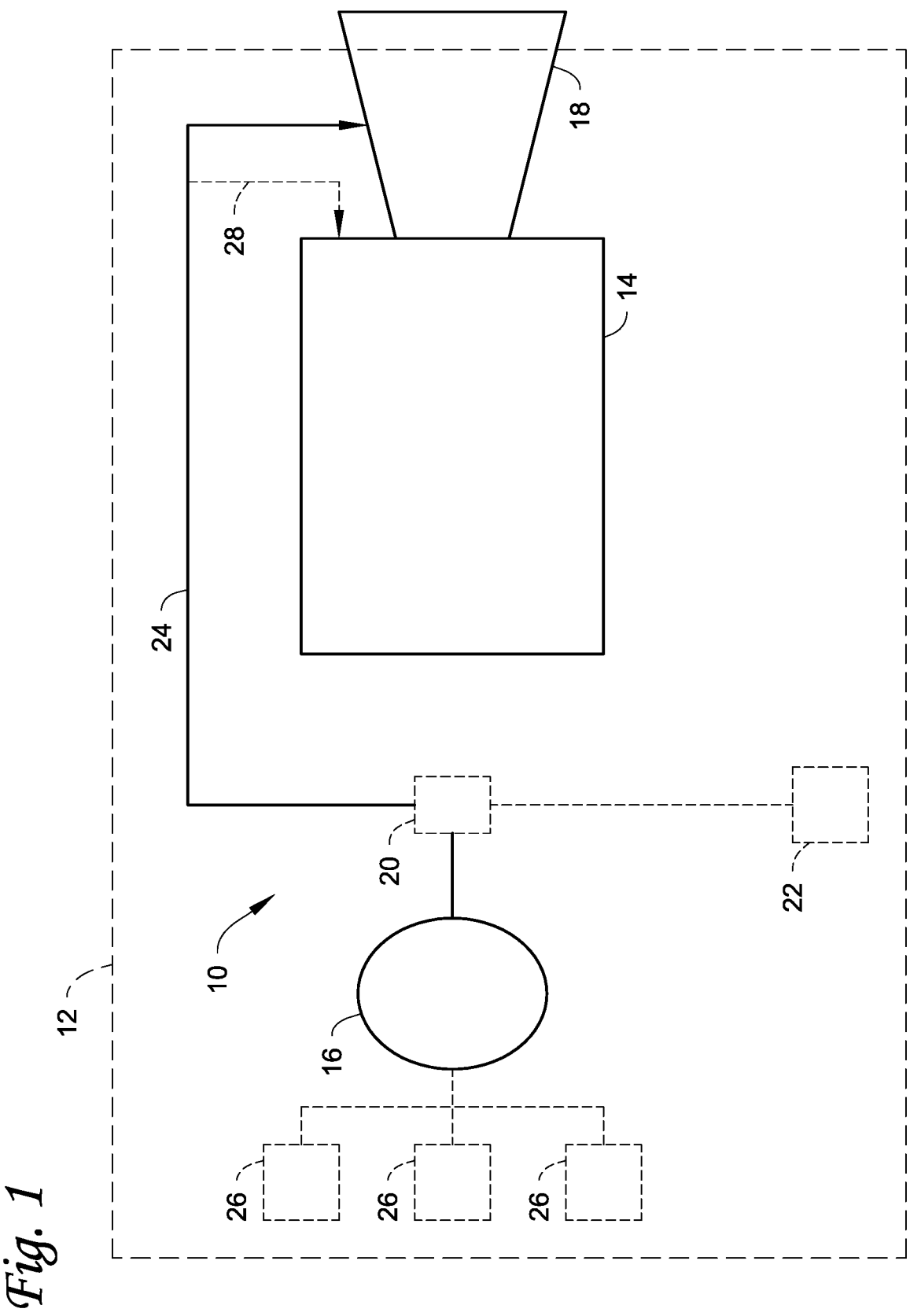

With reference initially to FIG. 1, a solid rocket motor 10 described herein is illustrated. The solid rocket motor 10 is mounted on a vehicle 12 (shown in dashed lines), such as a space vehicle, to provide propulsion to the vehicle 12. The solid rocket motor 10 includes a solid propellant section 14 with a combustion chamber, a source of liquid monopropellant 16, and a nozzle 18 having a nozzle throat 19 (seen in FIGS. 2 and 3) through which combustion gas from the combustion chamber exits. As described in further detail below, liquid monopropellant from the source 16 can be introduced indirectly (via the nozzle 18) or directly into the solid propellant section 14 to control the burn rate of solid propellant in the solid propellant section 14. In addition, liquid monopropellant from the source 16 can be introduced into the nozzle 18 to control various flight dynamics, such as thrust vector and/or roll, of the solid rocket motor 10 (and thereby of the vehicle 12 that the solid rocket motor 10 is mounted on). In addition, liquid monopropellant from the source 16 can be introduced into one or more regenerative cooling passageways of the nozzle 18 to cool various parts of the nozzle 18 prior to the monopropellant being injected into the solid propellant section 14.

The liquid monopropellant can be fed from the source 16 to the various parts of the solid rocket motor 10 using any suitable feed mechanisms. For example, in one embodiment, a pump 20 (shown in dashed lines) driven by a suitable drive mechanism 22 (also shown in dashed lines) such as a motor or turbine can be used to pump the monopropellant in liquid form from the source 16 to the nozzle 18 via one or more suitable passageways 24 described further below with respect to FIG. 6. In another embodiment, instead of using the pump 20, the liquid monopropellant can be pressure-fed from the source 16 using one or more sources of pressure 26, for example pressurized helium, that can be in fluid communication with the source 16 to force monopropellant from the source 16 using pressure supplied from the pressure source(s) 26. In one embodiment, monopropellant can be fed from the source 16 directly into the solid propellant section 14 via a direct feed passageway 28. Valves can be provided in the passageways 24, 28, in the outlet from the source 16, and between the pressure source(s) 26 and the source 16, to control the flows of the various fluids.

Figure 2:
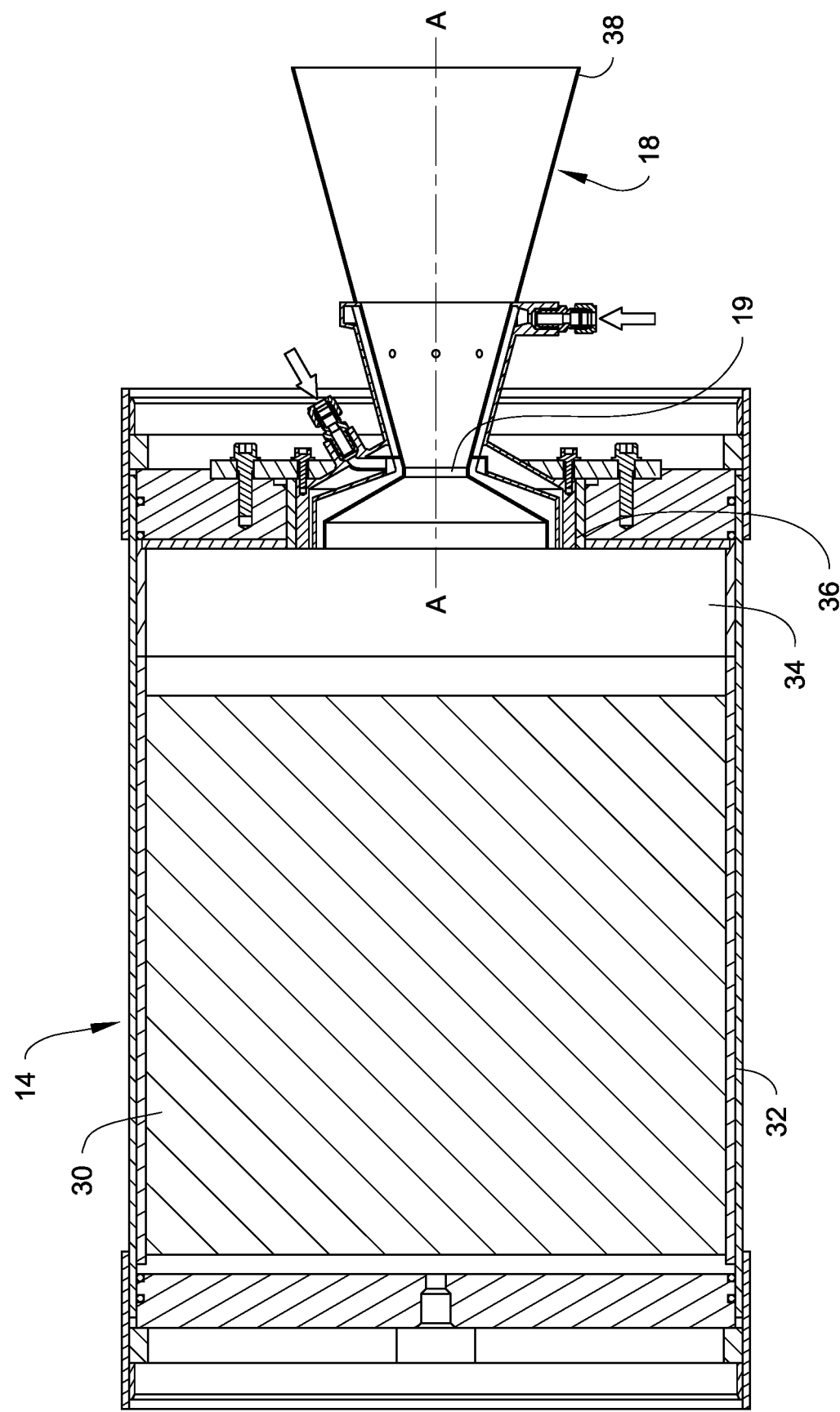

Referring to FIGS. 2 and 3, details of the solid propellant section 14 and the nozzle 18 will now be described. The solid propellant section 14 includes a solid propellant 30 contained within a housing 32 which defines a combustion chamber 34. The solid propellant 30 can be any solid propellant, known or developed after filing this application, which can be used in a solid rocket motor, and for which the burn rate of the solid propellant 30 can be controlled using the monopropellant from the source 16. The solid propellant preferably includes an oxidizer. Many solid propellants that could be used are known. The solid propellant can be ignited using an ignition source well known in the art. The solid propellant acts like a thermal catalyst to drive the decomposition of even the most stable monopropellants.

When the solid propellant is ignited, the combustion products are exhausted through the nozzle 18 to generate thrust. In the illustrated example, the nozzle throat 19 can be part of (i.e. integrated with) the nozzle 18 whereby the nozzle throat 19 and the nozzle 18 form a single piece unitary construction. The integration of the nozzle throat 19 and the nozzle 18 facilitates reusability, whereby after use, the rest of the solid rocket motor 10 can be discarded but the integrated nozzle 18/nozzle throat 19 assembly can be recovered and reused.

Still referring to FIGS. 2 and 3, the integrated nozzle 18/nozzle throat 19 assembly is removably secured to the end of the housing 32 of the solid propellant section 14, for example using suitable fasteners. The nozzle 18 includes a central longitudinal axis A-A which is coaxial with the longitudinal axis of the solid propellant section 14. In addition, the nozzle 18 has a first or forward end 36 facing toward the combustion chamber 34, and a second or rear end 38 defining the tail end of the nozzle 18.

In one embodiment shown in FIG. 11, a gas-deployed nozzle extension 40 (also known as a gas-deployed skirt) can be disposed at the second end 38 of the nozzle 18. The gas-deployed nozzle extension 40 includes a plurality of portions 42 that allow the nozzle extension 40 to move from a folded or non-deployed position (not shown) where the portions 42 are folded and extend generally radially inward toward the central longitudinal axis A-A, and a deployed position shown in FIG. 11. The nozzle extension 40 is moved from the non-deployed position to the deployed position by the gases exiting the nozzle 18. An example of a gas-deployed nozzle extension is disclosed in U.S. Pat. No. 4,387,564, the entire contents of which are incorporated herein by reference.

Figure 4:
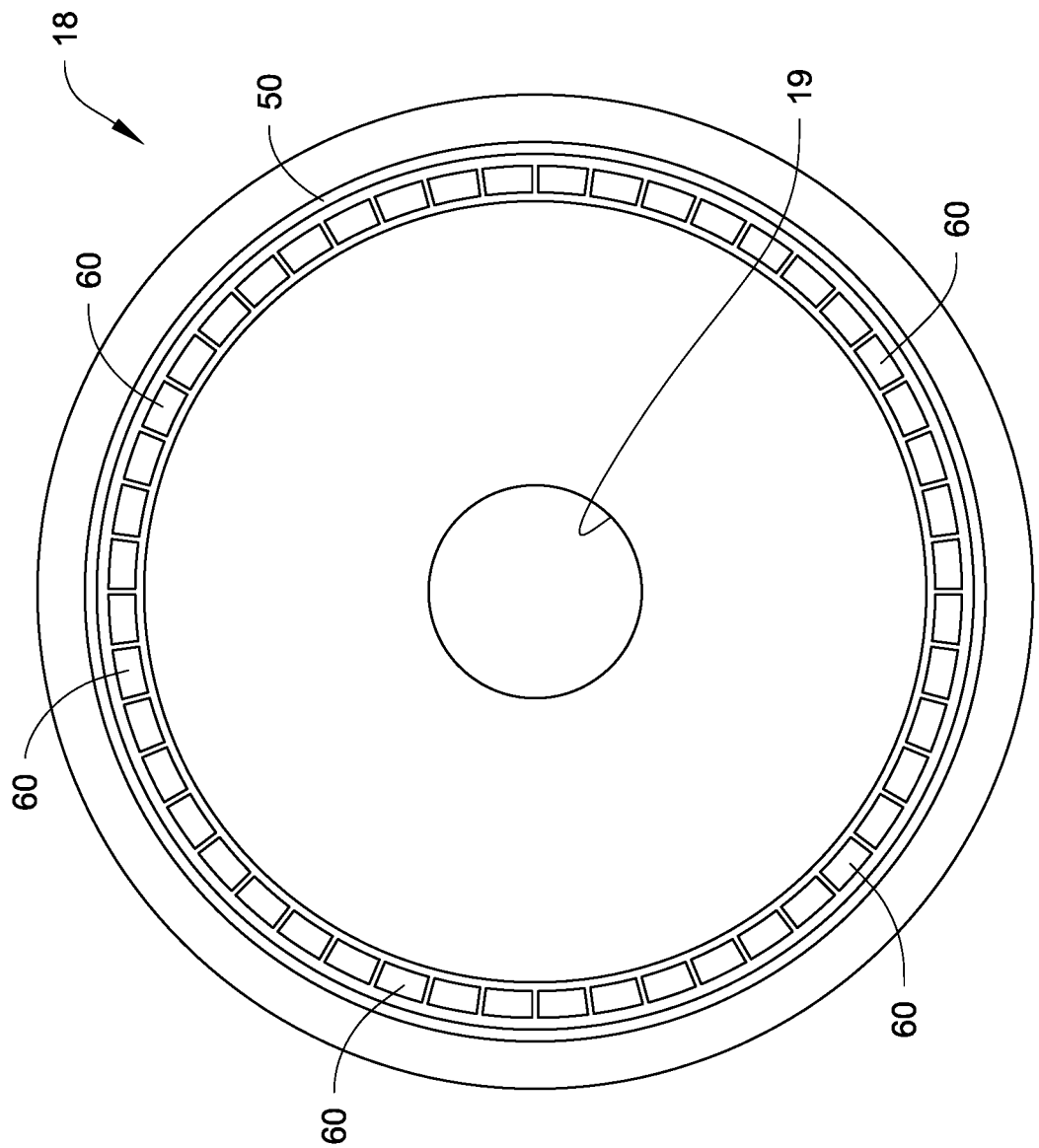
FIG. 4 is an end view of the nozzle showing the injector openings.

As best seen in FIG. 3, the nozzle 18 is formed with a nozzle regenerative cooling passageway 44 for use in cooling a portion of the nozzle 18 using the monopropellant from the source 16. The passageway 44 can be formed to extend over any desired length of the nozzle 18, and the passageway 44 can extend around the entire circumference of the nozzle 18 to cool the entire circumference, or extend around less than the entire circumference. In the illustrated example, the passageway 44 extends over a front section of the nozzle 18 stopping short of the nozzle throat 19. The passageway 44 has an inlet 46 that is fluidly connected to the source of monopropellant 16 to feed monopropellant into the passageway 44. In addition, the passageway 44 includes an exit manifold 48 that fluidly connects to an outlet 50 that injects monopropellant into the combustion chamber 34. Referring to FIG. 4, the outlet 50 can be a circumferentially continuous annulus that is circumferentially arranged around the axis A-A. However, in other embodiments, the outlet 50 can be defined by an array of discrete, individual injector openings. The outlet 50 has an injection axis that is parallel to the central longitudinal axis A-A.

In operation of the passageway 44, the liquid monopropellant is introduced into the passageway 44 through the inlet 46. The monopropellant then flows in the direction of the arrows 52 (FIG. 3), thereby cooling the nozzle 18 before the now warmed/hot monopropellant (whether in liquid phase and/or in gas phase) flows into the manifold 48 and then to the outlet 50 where the monopropellant is injected into the combustion chamber 34.

Monopropellant Mixture Ratio (MMR) is defined as the Mass Flow Rate of monopropellant divided by the Mass Flow Rate of gas from the solid propellant. The higher the MMR, the more trouble the monopropellant has decomposing. To assist in the decomposition of the monopropellant, one or more sensitizing agents can be added to the monopropellant. In one embodiment, the sensitizing agent(s) can be added in real time just before the monopropellant enters the combustion chamber. The sensitizing agent(s) can be in solid or liquid form. If in liquid form, one or more tanks or other sources of the liquid sensitizing agent(s) can be provided in addition to the source 16 of monopropellant. The monopropellant and the sensitizing agent(s) can be mixed together in real-time just prior to injection into the combustion chamber 34. This minimizes the danger of an explosion prior to launch or while in flight.

In another embodiment, to increase energy density, the monopropellant can be gelled using one or more gelling agents, and one or more metals can be added into the gelled monopropellant. Examples of gelling agents that could be used include, but are not limited to, fumed silica (also known as pyrogenic silica), guar gum and galactomannan gum. An example of a metal that can be added to the gelled monopropellant includes, but is not limited to, aluminum. In addition or alternatively, one or more metal hydrides can be added to the gelled monopropellant which provides increased energy density as well as increases the resulting specific impulse of the motor 10. Examples of metal hydrides that could be used include, but are not limited to, aluminum hydride, lithium hydride, aluminum lithium hydride, and beryllium hydride.

With continued reference to FIG. 3, the nozzle 18 is also formed with a throat regenerative cooling passageway 54 for use in cooling the nozzle throat 19 using the monopropellant from the source 16. The passageway 54 can surround the nozzle throat 19 to cool the entire circumference of the nozzle throat 19, or only extend around a part of the nozzle throat 19 to cool a portion of the nozzle throat 19. The passageway 54 has an inlet 56 that is fluidly connected to the source of monopropellant 16 to feed monopropellant into the passageway 54. In addition, the passageway 54 includes an exit manifold 58 that fluidly connects to an outlet 60 that injects monopropellant into the combustion chamber 34. Referring to FIG. 4, the outlet 60 can be an array of individual, discrete injector openings circumferentially arranged around the axis A-A and each of which has an injection axis that is parallel to the central longitudinal axis A-A. However, in other embodiments, the outlet 60 can be defined by a continuous annulus similar to the annulus 50.

In operation of the passageway 54, liquid monopropellant is introduced into the passageway 54 through the inlet 56. The monopropellant then flows in the direction of the arrows 62 (shown in FIG. 3), thereby cooling the throat 19 before the now warmed/hot monopropellant (whether in liquid phase and/or in gas phase) flows into the manifold 58 and then to the outlet 60 where the monopropellant is injected into the combustion chamber 34.

FIG. 7 shows an embodiment that is similar to FIG. 3, but includes a deflector 64 in the combustion chamber 34 to deflect the monopropellant exiting the outlets 50, 60 to produce a spray pattern. In particular, the deflector 64 is an annular structure disposed about the longitudinal axis A-A, with a curved deflecting surface 66 positioned near the outlets 50, 60. As the monopropellant exits the outlets 50, 60, the curved deflecting surface 66 deflects the monopropellant outward to help increase the diameter of the monopropellant injection plume into the combustion chamber 34.

Figure 5A:
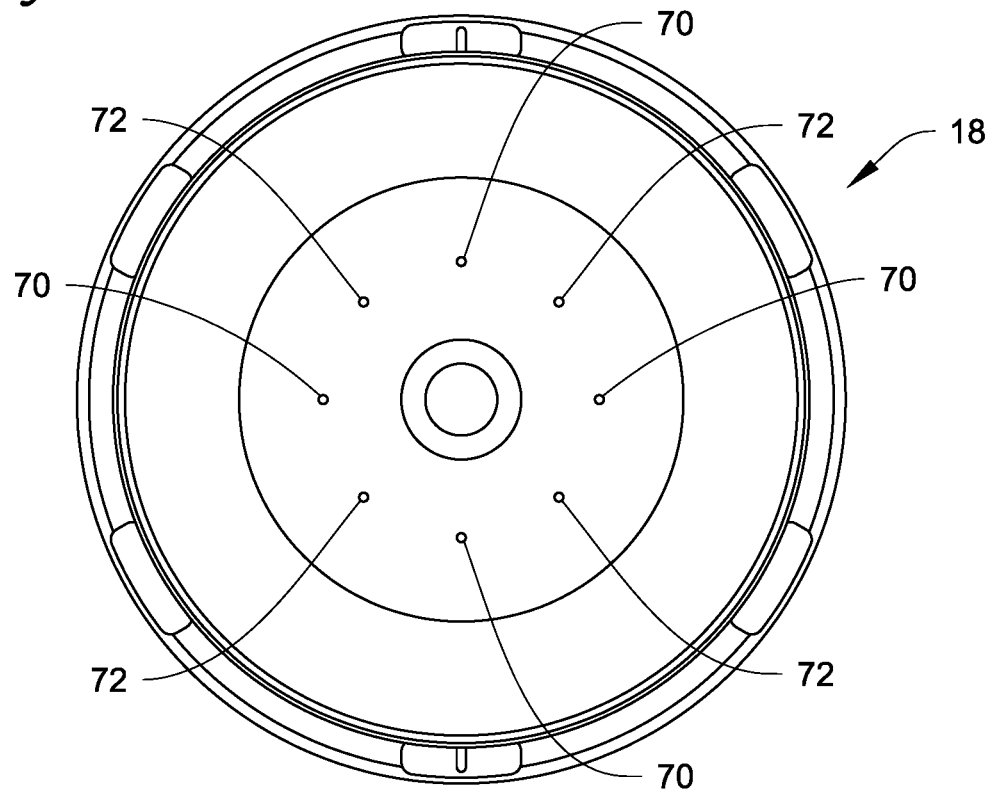
FIGS. 5A and 5B are end views of the nozzle showing the thrust vector control openings and the roll control openings.
Figure 5B:
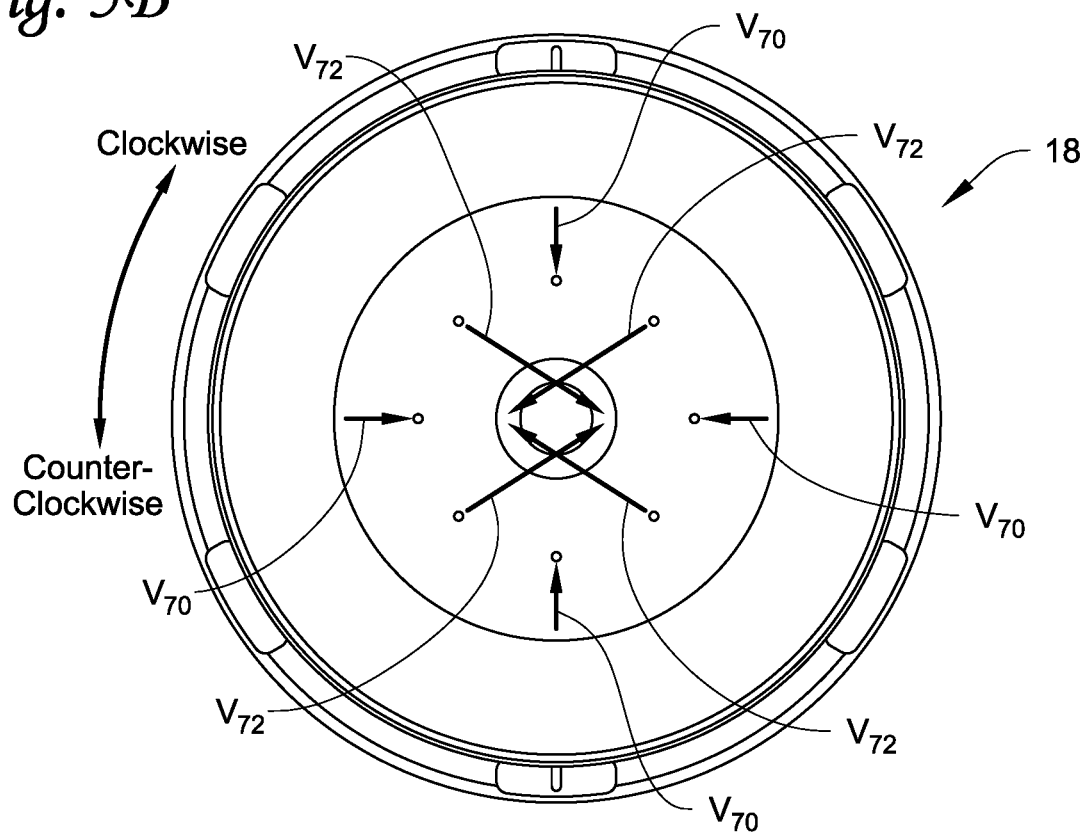

Referring again to FIG. 3 along with FIGS. 5A and 5B, the nozzle 18 can also be formed with a plurality of injector openings used to control various flight dynamics. For example, the nozzle 18 can include a plurality of thrust vector control injector openings 70 used to control a thrust vector of the solid rocket motor 10, and a plurality of roll control injector openings 72 used to control clockwise and counterclockwise roll of the solid rocket motor 10 about the longitudinal axis A-A. The injector openings 70, 72 need not be used together. Instead, the nozzle 18 can be formed with just the injector openings 70 if just thrust vector control is desired, or just the injector openings 72 if just roll control is desired, or have both the injector openings 70 and the injector openings 72 as illustrated.

As best seen in FIGS. 5A and 5B, there can be four of the injector openings 70 and four of the injector openings 72. However, a larger or smaller number of each set of injector openings 70, 72 can be used. In the illustrated example, the injector openings 70 are spaced 90 degrees apart from one another, with one injector opening 70 positioned at 0 degrees, a second injector opening 70 positioned at 90 degrees, a third injector opening 70 positioned at 180 degrees, and a fourth injector opening 70 positioned at 270 degrees. As best seen in FIG. 5B, each one of the thrust vector control openings 70 is configured so that monopropellant ejected therefrom has an outlet vector $V_{70}$ that intersects the central longitudinal axis A-A of the nozzle 18

(e.g. the vector $V_{70}$ is radial or perpendicular to the axis A-A). Therefore, monopropellant ejected from any one of the openings 70 has an initial velocity component that is substantially perpendicular to the axis A-A, i.e. substantially radially inward.

The injector openings 72 are also illustrated as being spaced 90 degrees apart from one another, with one injector opening 72 positioned at 45 degrees, a second injector opening 72 positioned at 135 degrees, a third injector opening 72 positioned at 225 degrees, and a fourth injector opening 72 positioned at 315 degrees. As best seen in FIG. 5B, each one of the roll control injector openings 72 is configured so that monopropellant ejected therefrom has an outlet vector $V_{72}$ that does not intersect the central longitudinal axis A-A of the nozzle 18. Instead, each outlet vector $V_{72}$ is angled relative to the axis A-A. Diametrically opposite injector openings 72 are configured to have outlet vectors $V_{72}$ in a common clockwise or counterclockwise direction. Accordingly, one pair of diametrically opposite injector openings 72 (for example the injector openings 72 positioned at 45 degrees and 225 degrees) can be used for counterclockwise roll control, while another pair of diametrically opposite injector openings 72 (for example the injector openings 72 at 135 degrees and 315 degrees) can be used for clockwise roll control.

With reference to FIGS. 5A, 5B, each one of the injector openings 70, 72 is in selective fluid communication with the source of monopropellant 16 (FIG. 1) via suitable control valves. The injector openings 70 are selectively used to inject monopropellant into the exhaust flowing through the nozzle 18. The injection of the monopropellant through one of the injector openings 70 produces a shock wave that deflects the exhaust plume, thereby altering the thrust vector of the solid rocket motor 10. The monopropellant can be injected through a single one of the injector openings 70 or simultaneously through multiple ones of the injector openings 70. In addition, the amount of monopropellant that is injected through the injector openings 70 can be different for some injector openings 70 compared to other ones of the injector openings 70. In some embodiments, the size of the injector openings 70 may be varied during use of the solid rocket motor 10 to alter the resulting thrust vector control that is achieved. Therefore, by controlling which injector opening(s) 70 is fed with monopropellant, the amount of monopropellant that is injected, etc., the exhaust plume can be deflected in a desired direction to thereby desirably alter the resulting thrust vector of the solid rocket motor 10.

Similarly, the injector openings 72 are selectively used to inject monopropellant into the exhaust flowing through the nozzle 18. For example, the monopropellant can be injected at two opposing locations of the injector openings 72 (e.g., 45 degrees and 225 degrees, or 135 degrees and 315 degrees). The injection produces nozzle shock waves that act like jet vanes to adjust the roll clockwise or counterclockwise. In some embodiments, monopropellant may be injected through a single one of the injector openings 72. Alternatively, the amount of monopropellant injected through the injector openings 72 can be different for some injector openings 72 compared to other ones of the injector openings 72. In some embodiments, the size of the injector openings 72 may be varied during use of the solid rocket motor to alter the resulting roll control that is achieved.

The injector openings 70, 72 are illustrated as being "interleaved" with one another whereby the injector openings 70, 72 are positioned at the same axial location on the nozzle 18. However, other positions of the injector openings 70, 72 are possible. For example, the injector openings 70 can be positioned axially ahead of the injector openings 72 whereby the injector openings 70 are closer to the nozzle throat 19 than the injector openings 72 are. Alternatively, the injector openings 72 can be positioned axially ahead of the injector openings 70 whereby the injector openings 72 are closer to the nozzle throat 19 than the injector openings 70 are.

In addition, the injector openings 70, 72 can have any shape suitable for achieving the thrust vector control and roll control described herein. For example, the injector openings 70, 72 can be circular, oval, triangular, rectangular, square or other shape or combination of shapes.

FIG. 6 illustrates an example of a fluid circuit between the source of monopropellant 16 and the thrust vector control openings 70, the roll control openings 72, and the regenerative cooling passageways 44, 54 of the nozzle. A monopropellant valve 74, such as a pyrotechnic valve, is disposed in the outlet of the source 16 to act as a main control valve for the flow of monopropellant from the source 16. The fluid passageway 24 leads to a plurality of solenoid controlled valves 76 each one of which is associated with a corresponding one of the injector openings 70, 72 to selectively control the flow of monopropellant to the respective injector opening 70, 72. Likewise, the fluid passageway 24 from the source 16 to the nozzle regenerative cooling passageway 44 includes a solenoid controlled valve 78 that selectively controls the flow of monopropellant to the nozzle regenerative cooling passageway 44. In addition, the fluid passageway 24 from the source 16 to the nozzle throat regenerative cooling passageway 54 includes a solenoid controlled valve 80 that selectively controls the flow of monopropellant to the nozzle throat regenerative cooling passageway 54.

Another embodiment of the solid rocket motor 10 is illustrated in FIG. 8 with different examples of injection scenarios of the monopropellant. For example, the solid rocket motor 10 can be configured with one or more of aft-end injection of the monopropellant into the solid propellant section 14 via the passageway 28, head-end injection of the monopropellant into the solid propellant section 14 via one or more passageways 100 connected to an injector (not shown), and/or central/side injection of the monopropellant into the solid propellant section 14 via one or more passageways 102 connected to an injector (not shown). Flow through the passageway 28 can be controlled by a valve 104, flow through the passageway 100 can be controlled by a valve 108, and flow through the passageway 102 can be controlled by a valve 106. The valves 104, 106, 108 can be any type of controllable valves, such as solenoid controlled valves. One or more of the passageways 28, 100, 102 can be used for direct injection of monopropellant into the solid propellant section 14 even if the propulsive monopropellant used to enhance the specific impulse is being injected from the aft-end after flowing through one or more of the nozzle regenerative cooling passageways of the nozzle 18.

FIG. 8 also illustrates that after the monopropellant flows through one or more of the nozzle regenerative cooling passageways of the nozzle 18, the monopropellant can then be aft-injected as described above with respect to FIG. 3, head-end injected via a passageway 110, and/or central/side injected via a passageway 112. Flow through the passageway 110 can be controlled by a valve 114, and flow through the passageway 112 can be controlled by a valve 116. The valves 114, 116 can be any type of controllable valves, such as solenoid controlled valves.

Referring to FIG. 9, an embodiment of the solid rocket motor 10 is illustrated where the nozzle 18 is not cooled by the monopropellant (i.e. the nozzle does not include the throat regenerative cooling passageway or the nozzle regenerative cooling passageway described above in FIG. 3). However, the nozzle 18 can still include the thrust vector control injector openings and/or the roll control openings described above, and the monopropellant can still be directed to the thrust vector control injector openings and/or to the roll control openings. Since the monopropellant does not cool the nozzle 18, the monopropellant can be directly injected using aft-end injection via the passageway 28, head-end injection via the passageway 100, and/or central/side injection via the passageway 102. Flow through the passageway 28, 100, 102 can be controlled by the valves 104, 106, 108. In this embodiment, the nozzle 18 can be made from materials such as phenolics, graphite, carbon-carbon composites, and refractory materials.

In the solid rocket motors described herein, the burning of the solid propellant can be extinguished in what will be described herein as deluge extinguishment. In deluge extinguishment, the burning surface of the solid propellant is suddenly deluged with a suitable extinguishing material to extinguish the burning of the solid propellant. The extinguishing material can be, for example, water, water and monopropellant, or an excessive amount of monopropellant. In the embodiments described above, the excessive amount of the monopropellant can be supplied via the passageway 28 (FIG. 1), or the passageways 28, 100, 102 (FIGS. 8 and 9).

Water can also be used to achieve deluge extinguishment. For example, referring to FIG. 10, a supply of water 120 can be provided where the water can be controllably introduced into the solid propellant section 14 (for example, head-end as illustrated or after-end) and sprayed onto the solid propellant to extinguish the burning of the solid propellant. If necessary, the water in the supply 120 can be a mixture of water and an additive, such as methanol, to prevent freezing of the water. For example, a 55/45 mixture of water to methanol can be used.

In another embodiment, a combination of water (or water/methanol mixture) and monopropellant can be used to achieve deluge extinguishment. For example, referring to FIG. 10, the source of monopropellant 16 can be connected to the supply of water 120. When the solid rocket motor 10 is to be extinguished, the supply of water 120 is opened and the water is forced from the supply 120 by the pressurized monopropellant. The water flows thru a deluge injector at the head-end (or the aft-end) of the solid propellant section 14. Once the water is exhausted, the liquid monopropellant begins flowing through the injector and into the deluge injector. In this embodiment, the water begins the extinguishment with the liquid monopropellant finishing the extinguishment.

In some embodiments, the formulation of the solid propellant can help to achieve both the dP/dt extinguishment as well as the deluge extinguishment. In particular, increasing the metal content in the solid propellant grain leads to higher performance and also increases the extinguishability of the solid propellant. More metal fuel is added into the solid propellant grain than the solid oxidizer in the solid propellant grain can oxidize. For example, the solid propellant can have a metal content above 22% which is the traditional upper limit for a solid rocket motor. During operation, the solid propellant combusts some of the metal and the rest of the metal is released from the grain as unoxidized molten metal. When this molten metal comes in contact with the monopropellant, which has oxidizing species, the molten metal steals oxidizing species from the molecule and combusts. The molten metal then releases low molecular weight species that help achieve the high specific impulse of the solid rocket motor.

Many formulations of the solid propellant with high metal content are possible. The use of aluminum as the metal is advantageous. Aluminum typically extinguishes at a chamber pressure of less than 300 psi. In addition, aluminum combustion products are liquids/solids instead of gases. Further, extinguished aluminum does not generate the heat needed to drive remaining gas to high pressure by the perfect gas law. In addition, chamber pressure will collapse (i.e. reduce in a very short span of time) and the combustion of the solid propellant should extinguish when the introduction of monopropellant is stopped (i.e. dP/dt extinguishment).

High aluminum content solid propellant can be hard to ignite. To facilitate ignition, a layer of easier to ignite, lower aluminum content solid propellant can be added onto the high aluminum content solid propellant. The lower aluminum content propellant can then be ignited which transitions to and ignites the high aluminum content propellant. In an alternative technique to facilitate ignition of the high aluminum content solid propellant, a layer of magnalium (50% Mg/50% Al alloy) containing propellant can be added onto the high aluminum content solid propellant. The magnalium propellant ignites much more easily which ultimately transitions to and ignites the high aluminum content propellant.

| Comparison of Chemistry Before and After Monopropellant Termination | | |
|---|---|---|
| | Before Termination | After Termination |
| Percent Gaseous | 55-65 | 10-20 |
| Percent Non-gaseous | 35-45 | 80-90 |

An example operating sequence of the solid rocket motor including ignition and dP/dt extinguishment is as follows:

| Sequence | Event |
|---|---|
| 1 | Ignition signal received |
| 2 | Easier to ignite aluminum solid propellant ignites |
| 3 | Monopropellant flow begins |
| 4 | Easier to ignite solid propellant formulation transitions to high metal formulation |
| 5 | Thrust termination command received |
| 6 | Monopropellant valve closes |
| 7 | Only a small percentage of the mass that the high metal content solid propellant grain produces afterward is gaseous, chamber pressure collapses |
| 8 | Aluminum combustion extinguishes |
| 9 | Solid propellant extinguishes due to dP/dt |

In addition to thrust termination via extinguishment of the solid propellant, the concepts described herein allow throttling of the thrust of the solid rocket motor. In some applications of a solid rocket motor, it is desirable to have high thrust early in a rocket burn and thereafter reduce the thrust. For example, a "boost-sustain" solid rocket motor is provided where the boost thrust gets the vehicle to which the solid rocket motor is attached to a desired speed followed by a lower, sustained thrust to keep the vehicle from slowing down due to drag. The concepts described herein allow for active control/throttling of the thrust of the solid rocket motor by controlling the amount of the monopropellant injected into the combustion chamber. Therefore, the solid rocket motors described herein can be used for multiple applications or can respond to commands of a guidance system.

The monopropellant supplied from the source 16 can be any liquid monopropellant that is suitable for achieving the thrust vector control, the roll control, the nozzle and throat cooling, and the extinguishment described herein. The liquid monopropellant can have oxidizing species such as oxygen.

The solid rocket motor 10 has a number of unique features described above and below. Each of these following features can be used individually by itself on the solid rocket motor 10, in combination with one another, or in any grouping of features.

Integrated nozzle/throat assembly. The integrated nozzle/nozzle throat assembly facilitates reusability by allowing recovery and reuse of the nozzle/nozzle throat assembly.

Regenerative cooling of the nozzle. Provides cooling of the nozzle by the liquid monopropellant, followed by injection (aft end, head end, and/or central/side injection) of the monopropellant into the combustion chamber. The resulting elevated temperature of the monopropellant will help it to react more readily and with more energy in the combustion chamber.

Regenerative cooling of the nozzle throat. Provides cooling of the nozzle throat by the liquid monopropellant, followed by injection (aft end, head end, and/or central/side injection) of the monopropellant into the combustion chamber. The resulting elevated temperature of the monopropellant will help it to react more readily and with more energy in the combustion chamber.

Thrust vector control built into the nozzle. Allows the liquid monopropellant to be used to control the thrust vector of the solid rocket motor using the thrust vector control openings built into the nozzle.

Roll control built into the nozzle. Allows the liquid monopropellant to be used to control the roll of the solid rocket motor using the roll control openings built into the nozzle.

dP/dt extinguishment of the solid propellant. The solid rocket motor can be extinguished by suddenly stopping injection of the monopropellant. The extinguishment occurs because there is suddenly less reactive monopropellant in the combustion chamber which causes a drop in chamber pressure. Once the chamber pressure is below a certain pressure, the materials of the solid propellant grain stop combusting in an effective manner. That further decreases chamber pressure. This process of rapid chamber pressure decrease leads to a so-called dP/dt (rapid change in pressure over a short period in time) extinguishment. Chamber pressure holds the flame front on the surface of the burning solid propellant. However, a rapid pressure drop lifts the flame front off of the surface of the propellant leading to extinguishment.

Deluge extinguishment. If the burning surface of the solid propellant is suddenly deluged with a suitable extinguishing material, such as water, water and monopropellant, or an excessive amount of monopropellant, the burning of the solid propellant can be extinguished.

Pulsed operation of the solid rocket motor. The solid rocket motor can be extinguished, for example by dP/dt extinguishment, and then dwell for some period of time in the off condition. Thereafter the monopropellant can be reintroduced into the combustion chamber to reignite the solid propellant. This process of dP/dt extinguishment and re-ignition can be repeated multiple times. In some embodiments, a supplemental igniter can be provided to aid in reigniting the solid propellant.

Throttling of solid rocket motor. The thrust of the solid rocket motor can be controlled by controlling the amount of the monopropellant injected into the combustion chamber.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A solid rocket motor, comprising:
a solid propellant section having a head-end, an aft-end, a solid propellant and a combustion chamber between the solid propellant and the aft-end, the solid propellant includes a metal;
a nozzle having a nozzle throat, the nozzle having a central longitudinal axis;
a source of monopropellant fluidly connected to the combustion chamber, the source of monopropellant containing a monopropellant;
the solid propellant section includes a plurality of monopropellant injector openings at the aft-end that are fluidly connected to the source of monopropellant and that aft-end inject monopropellant into the combustion chamber, the monopropellant injector openings face in a direction toward the solid propellant;
a deflector in the combustion chamber and located between the solid propellant and the aft-end, the deflector is positioned to deflect monopropellant exiting the monopropellant injector openings to produce a spray pattern, the deflector comprises an annular structure disposed about the central longitudinal axis and a curved deflecting surface adjacent to the monopropellant injector openings that deflects monopropellant exiting the monopropellant injector openings so that the spray pattern has a radial outward component and a component toward the head-end.

2. The solid rocket motor of claim 1, wherein the nozzle throat and the nozzle form a single piece unitary construction.

3. The solid rocket motor of claim 1, wherein the monopropellant is gelled.

4. The solid rocket motor of claim 1, wherein an interior of the deflector forms a flow path for combustion gas from the combustion chamber to the nozzle throat.

5. The solid rocket motor of claim 1, wherein the monopropellant includes a metal and/or a metal hydride.

6. A solid rocket motor, comprising:
a solid propellant section having a head-end, an aft-end, a solid propellant and a combustion chamber between the solid propellant and the aft-end, the solid propellant includes an oxidizer and a metal;
a nozzle having a nozzle throat, the nozzle having a central longitudinal axis, and in an end view the nozzle is circular;
a source of monopropellant fluidly connected to the nozzle, the source of monopropellant containing a monopropellant;
the nozzle includes:
a plurality of thrust vector control injector openings fluidly connected to the source of monopropellant;
a plurality of roll control injector openings fluidly connected to the source of monopropellant;
wherein the plurality of thrust vector control injector openings and the plurality of roll control injector openings are equally spaced from each other and are positioned on the nozzle at a same axial location and are interleaved with one another;

the solid propellant section includes a plurality of monopropellant injector openings at the aft-end that are fluidly connected to the source of monopropellant and that aft-end inject monopropellant into the combustion chamber, the monopropellant injector openings face in a direction toward the solid propellant;

a deflector in the combustion chamber and located between the solid propellant and the aft-end, the deflector is positioned to deflect monopropellant exiting the monopropellant injector openings to produce a spray pattern, the deflector comprises an annular structure disposed about the central longitudinal axis and a curved deflecting surface adjacent to the monopropellant injector openings that deflects monopropellant exiting the monopropellant injector openings so that the spray pattern has a radial outward component and a component toward the head-end.

7. The solid rocket motor of claim 6, wherein the nozzle throat and the nozzle form a single piece unitary construction.

8. The solid rocket motor of claim 6, wherein the monopropellant is gelled.

9. The solid rocket motor of claim 6, wherein the source of monopropellant comprises a balloon tank that has no internal insulation.

10. The solid rocket motor of claim 6, further comprising a source of pressure separate from and fluidly connected to the source of monopropellant whereby the monopropellant from the source of monopropellant is pressure-fed from the source of monopropellant.

11. The solid rocket motor of claim 6, wherein the monopropellant includes a metal and/or a metal hydride.

12. The solid rocket motor of claim 6, wherein an interior of the deflector forms a flow path for combustion gas from the combustion chamber to the nozzle throat.

* * * * *